US010475134B2

(12) United States Patent
Liu et al.

(10) Patent No.: US 10,475,134 B2
(45) Date of Patent: Nov. 12, 2019

(54) SPONSORED RECOMMENDATION IN A SOCIAL NETWORKING SYSTEM

(71) Applicant: Facebook, Inc., Menlo Park, CA (US)

(72) Inventors: Deborah Liu, Menlo Park, CA (US); Nipun Mathur, Menlo Park, CA (US); Jeffrey Andrew Kanter, San Francisco, CA (US); Vijaye Raji, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 58 days.

(21) Appl. No.: 13/749,557

(22) Filed: Jan. 24, 2013

(65) Prior Publication Data
US 2014/0207793 A1    Jul. 24, 2014

(51) Int. Cl.
G06Q 50/00    (2012.01)

(52) U.S. Cl.
CPC ................... *G06Q 50/01* (2013.01)

(58) Field of Classification Search
CPC ...................................... G06Q 50/01
USPC .......................... 705/14.46, 14.55
See application file for complete search history.

(56) References Cited

U.S. PATENT DOCUMENTS

| 8,117,197 B1 | 2/2012 | Cramer |
| 2003/0110492 A1 | 6/2003 | Thurston et al. |
| 2005/0149397 A1 | 7/2005 | Morgenstern et al. |
| 2008/0228587 A1 | 9/2008 | Slaney et al. |
| 2012/0030185 A1 | 2/2012 | Gnanamani et al. |
| 2014/0019233 A1* | 1/2014 | Goder ............... G06Q 30/0251 705/14.46 |

FOREIGN PATENT DOCUMENTS

WO    WO-2012023076 A2 *    2/2012    ........... H04N 21/252

OTHER PUBLICATIONS

Sean D. Young, Recommendations for Using Online Social Networking Technologies to Reduce Inaccurate Online Health Information, 2011 (Year: 2011).*
U.S. Appl. No. 13/549,080, filed Jul. 13, 2012, Inventor: Andrey Goder et al. (copy not enclosed).
International Search Report and Written Opinion, International Application No. PCT/US2014/010754, dated Apr. 23, 2014, 9 pages.

* cited by examiner

Primary Examiner — Tarek Elchanti
(74) Attorney, Agent, or Firm — Fenwick & West LLP

(57) ABSTRACT

A social networking system presents suggestions to a user of a social networking system to use or install one or more applications accessible in the system. The social networking system offers suggestions by ranking candidate applications for a particular user and selecting applications to recommend based on the rankings. Advertisers associated with some applications may bid to boost the rankings of an application, making it more likely to appear for a given user.

10 Claims, 3 Drawing Sheets

SPONSORED RECOMMENDATION IN A SOCIAL NETWORKING SYSTEM

BACKGROUND

This disclosure generally relates to social networking systems, and in particular to providing suggested content items to users in a social networking system.

Social networking systems enable users (including people, businesses, and other entities) to form connections and interact with other users. Social networking systems may also enrich the user experience by identifying, recording, and using the connections and interactions among the users to suggest actions or to provide additional content. For example, a social networking system may infer a user's interest in a particular topic based on the user's interactions with objects related to that topic. This information may also be used to suggest content to a user that is relevant to that particular user's interests.

Many social networking systems select content items for presentation to a user based on the likelihood of the user having an interest in the content items. For example, a social networking system selects content items presented to a user on a web page maintained by the social networking system (a "page") based on the likelihood the user will have an interest in the content items. The social networking system often analyzes various factors, such as a user's history of interaction with objects on the social networking system, content item attributes, and user connections to other users, to determine content items for presentation to a viewing user. For example, a viewing user may be more interested in stories relating to a specific user connected to the viewing user than in stories relating to other uses with which the viewing user rarely interacts. This encourages a user viewing the content items (a "viewing user) to further interact with the social networking system.

SUMMARY

A social networking system provides one or more recommendation units to its users to increase user interaction with the social networking system. The recommendation units suggest actions to increase the viewing user's interaction with the social networking system. For example, a recommendation unit may provide a suggestion for the viewing user to establish a connection with another user as well as a link enabling the user to do so. In other examples, a recommendation unit encourages the viewing user to invite a friend to an event, identify a friend in a photo, or join a group, among various other types of social interaction. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria. The social networking system selects one or more recommendation units to send to a user based at least in part on this score.

Content providers, such as application providers, may compensate the social networking system for presenting recommendation units associated with the content providers or their content in the social networking system. For example, an application provider may compensate the social networking system for presenting recommendation units suggesting a user download an application. A content provider may provide the social networking system with bid amounts associated with recommendation units for presentation. Based on the bid amount, the social networking system modifies the score associated with a recommendation unit identified by the content provider. For example, the score of the recommendation unit is increased by an amount based on the bid amount.

The recommendation units are ranked based on their associated scores, and recommendation units are selected for presentation to the user based on the ranking. For example, the highest ranked recommendation units or recommendation units having at least a threshold ranking are presented to the user. Thus, increasing the score of a recommendation unit increases the ranking of the recommendation unit, which increases the likelihood that it is presented to a user.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview of a Social Networking System

Figure 1:
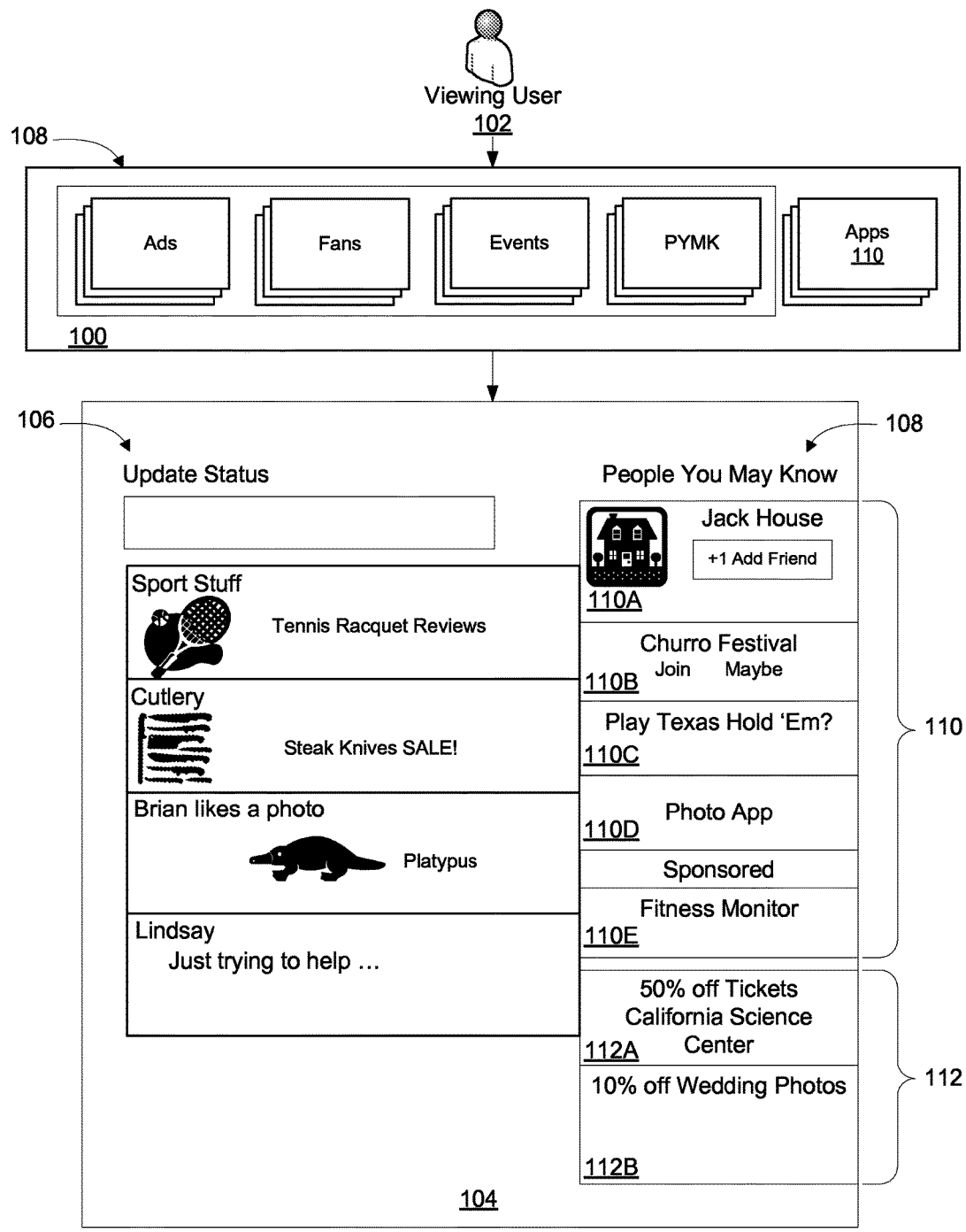
FIG. 1 is a diagram illustrating selection and presentation of content to a user by a social networking system, in accordance with one embodiment.

FIG. 1 shows an example of a social networking system 100 that provides content to a viewing user of the social networking system 100. In the example shown by FIG. 1, the social networking system 100 provides narrative content 106 and suggestion content 108 to the viewing user 102. In the example of FIG. 1, the narrative content 106 and the suggestion content 108 are presented in separate regions of a display 104. However, in other embodiments, the narrative content 106 and the suggestion content 108 may be combined or may be organized in the display 104 differently than the example shown in FIG. 1.

The narrative content 106 describes actions taken by other users of the social networking system 100 that are connected to the viewing user 102. Examples of content included in the narrative content 116 include news stories, media provided to the social networking system 100 (e.g., pictures or videos), status messages of other users of the social networking system 100, links posted by users to the social networking system 100, events, plans, groups, pages (e.g., representing an organization or entity), or other content provided by or accessible via the social networking system 100. In one embodiment, the narrative content 106 is a newsfeed including stories describing actions taken by other social networking system users connected to the viewing user 102, a status of social networking system users connected to the viewing user 102, events in the social networking system 100, content posted by other social networking systems, or similar data. In addition to presenting the narrative content 106, the social networking system 100 may also receive data from the viewing user 102 for inclusion in the narrative content presented to other users. Additionally, the narrative content 106 may display information from a user profile associated with the viewing user 102. For example, the narrative content 106 displays actions taken by the viewing user 102, demographic information about the viewing user 102, photographs or other media associated with the viewing user 102, interests about the viewing user 102, or other data describing attributes of the viewing user 102.

The suggestion content 108 includes content items suggesting actions for the viewing user 102 to perform and/or suggesting content with which the viewing user 102 may interact Content items included in the suggestion content 108 are selected by the social networking system 100 for the viewing user 102. In one embodiment, content items in the suggestion content 108 are one or more recommendation units 110 and one or more advertisements 112. A recommendation unit 110 suggests an action for the viewing user 102 to perform that increases the viewing user's 102 interaction with the social networking system 100. For example, a recommendation unit 110 suggests other users of the social networking system 100 with which the viewing user 102 may establish a connection and includes a link for connecting the viewing user 102 to a suggested user. In FIG. 1, recommendation unit 110A illustrates suggestions for connecting the viewing user 102 with other users. As another example, a recommendation unit 110B identifies an event for the viewing user 102 to attend. FIG. 1 also shows a recommendation unit 110C suggesting an online game to the viewing user 102 and a recommendation unit 110D suggesting a photo application. Other examples of the recommendation units 110 identify applications for the viewing user 102 to use or download, identify one or more groups of users for the viewing user 102 to join, identify users of the social networking system 100 for which the viewing user 102 may express a preference, suggest the viewing user 102 invite additional individuals or entities to join the social networking system 100, suggest gifts that the viewing user 102 may give to other users, suggest fan pages that the viewing user 102 may join, suggest other items that may be of interest to the viewing user 102, or suggest any other suitable action increasing interaction between the viewing user 102 and the social networking system 100. Using the recommendation units 110, the social networking system 100 may suggest actions for the viewing user 102 that increase the engagement with the social networking system 100, with a particular sponsored content item, or allow the social networking system 100 to interact with more users. This allows the social networking system 100 to obtain additional information about the viewing user 102 or to increase the number of users of the social networking system 100.

As users accumulate connections to increasing numbers of objects and users via the social networking system 100, the suggestion content 108 and the narrative content 106 may become inundated with content items less relevant to the interests of the viewing user 102. Ranking content items according to the viewing user's interests and affinities for objects on the social networking system 100 increases the likelihood that the viewing user may readily access content items of interest via the suggestion content 108 and the narrative content 106. To provide greater flexibility in selecting content items, such as recommendation units 110 presented to the viewing user 102, the social networking system 100 may modify a ranking of a recommendation unit 110 or other content item based on various factors. For example, application providers and other content providers may provide compensation to the social networking system 100 to sponsor one or more recommendation units 110 for presentation to various viewing users 102. For example, application or content providers may specify bid amounts to the social networking system 100 for presenting a specified recommendation unit 110 to a viewing user 120 satisfying one or more criteria identified by an application or content provider. This also allows content providers to influence how the social networking system 100 selects which recommendation units to present on a per user basis.

Each of the recommendation units 110 is associated with a score based on a value to the social networking system 100 of the viewing user 102 performing the recommended action identified by the candidate recommendation unit, or "converting" the recommendation unit into information for the social networking system 100. For example, the recommendation units 110 that suggest a viewing user 102 invite new users to the social networking system 100 (or establish connections with other social networking system users) are associated with a high score. This high score is due to the conversion of such recommendation units providing additional users to the social networking system 100 or increasing the interaction between the viewing user 102 and other social networking system users, thereby increasing the size or use of the social networking system 100 as a whole. In the preceding examples, when the viewing user 102 converts recommendation units 110 into an action, the social networking system 100 obtains additional information about the viewing user 102, allowing it to more accurately identify content of interest to the viewing user 102, or obtain additional users for the social networking system 100.

The suggestion content 108 may also include one or more advertisements 112, which are content provided by one or more advertisers that compensate the social networking system 100 for presenting the advertisements 112 to the user. In one embodiment, an advertiser associates a bid amount with the advertisement 112 provided to the social networking system 100. The bid amount is used to determine the compensation received by the social networking system 100 if the advertisement 112 is presented to a user, such as the viewing user 102, or if the user interacts with the displayed advertisement 112. The bid amount is used to determine an expected value to the social networking system 100 of presenting the advertisement 112. For example, the bid amount of the advertisement 112 is multiplied by a probability of the advertisement being converted to determine the expected value of the advertisement. As another example, the bid amount acts as the expected value by specifying an amount of money the social networking system 100 receives from the advertiser if the advertisement 112 is displayed. Other advertisement valuation models may also be applied.

In various embodiments, the suggestion content 108 includes a limited amount of information. For example, the suggestion content 108 may include seven "slots" in which content items selected from the recommendation units 110 and the advertisements 112 are displayed. The example suggestion content 108 shown by FIG. 1 includes two advertisements 112A and 112B and five recommendation units, 110A, 110B, 110C, 110D, and 110E. In one embodiment, the suggestion content 108 includes a specified number of the recommendation units 110 and a specified number of the advertisements 112. However, in other embodiments, the suggestion content 108 may include a variable number of the recommendation units 110 and a variable number of the advertisements 112, with at least one of each being included in the suggestion content 108.

Accordingly, the social networking system 100 selects advertisements 112 and recommendation units 110 for the suggestion content 108 that maximize the benefit to the social networking system 100 if the viewing user 102 interacts with a recommendation unit 110 or with an advertisement 112. For example, the social networking system 100 includes the recommendation unit 110 having the highest score in the suggestion content 108 and/or includes the advertisement 112 having the highest expected value in the suggestion content 108. This allows the social networking system 100 to obtain the maximum amount of information if the recommendation unit 110 is converted and/or to obtain the maximum compensation from an advertiser if the advertisement 112 is presented.

As described above, the recommendation units 110 have a score determined by the social networking system 100 based on a value to the social networking system of the viewing user performing the recommended action identified by the candidate recommendation unit, or "converting" the recommendation unit into information for the social networking system. In some embodiments, the score associated with a recommendation unit 110 may be increased based on a bid amount provided to the social networking system 100 by an application provider or a content provider associated with the recommendation unit 110. The bid amount associated with the recommendation unit as well as the likelihood of the viewing user 120 interacting with the recommendation unit may be used to determine an expected value of the recommendation unit that may be used to modify the score of the recommendation unit 110 when selecting content for the suggestion content 108.

Figure 2:
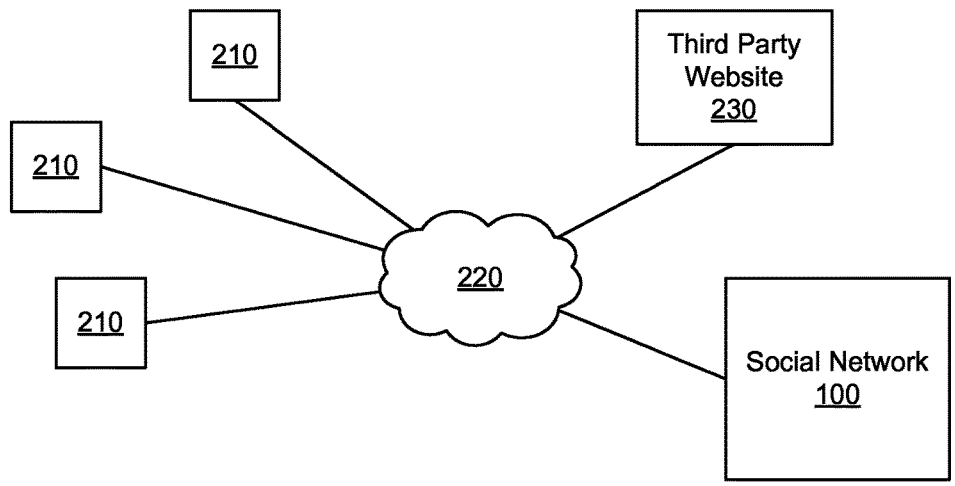
FIG. 2 is a high level block diagram illustrating a system environment including a social networking system, in accordance with one embodiment.

FIG. 2 is a high level block diagram illustrating a system environment 200 for the social networking system 100. In FIG. 2, the system environment 200 comprises one or more client devices 210, a network 220, one or more third-party websites 230 and the social networking system 100. In alternative configurations, different and/or additional components may be included in the system environment 200. The embodiments described herein can be adapted to online systems that are not social networking systems.

A client device 210 is a computing device capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smartphone, or similar device. The client device 210 is configured to communicate with other components via the network 220. In one embodiment, a client device 210 executes an application allowing a user of the client device 210 to interact with the social networking system 100. For example, a client device 210 executes a browser application to enable interaction between the client device 210 and the social networking system 100 via the network 220. In another embodiment, a client device 210 interacts with the social networking system 100 through an application programming interface (API) that runs on the native operating system of the client device 210, such as IOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include communication links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of the communication links may be encrypted using conventional encryption technologies such as secure sockets layer (SSL), transport layer security (TLS), and Internet Protocol security (IPsec).

The third party website 230 may be coupled to the network 220 for communicating with the social networking system 100, which is further described below in conjunction with FIG. 3. In some embodiments, the third party website 230 provides content and/or an application to the social networking system 100 for presentation to the social networking system users. As further described below, a third-party website 230 may provide bid amounts to the social networking system 100 to present recommendation units that suggest social networking system users access an application, or other content, associated with the third party website 230.

Figure 3:
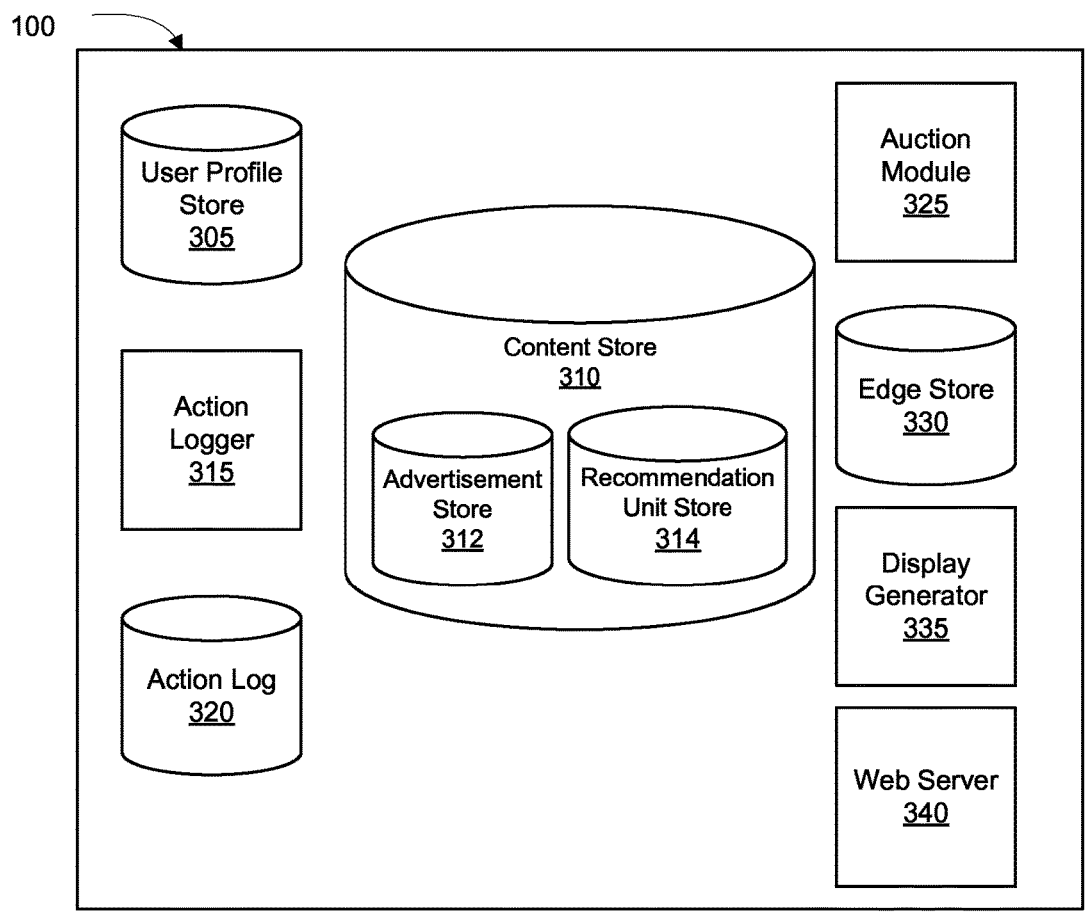
FIG. 3 is a block diagram of a system architecture of a social networking system, in accordance with an embodiment.

FIG. 3 is a block diagram of one embodiment of a system architecture of the social networking system 100. In the example of FIG. 3, the social networking system 100 includes a user profile store 305, a content store 310, an action logger 315, an action log 320, an auction module 325, an edge store 330, a display generator 335, and a web server 340. In other embodiments, the social networking system 100 may include additional, fewer, or different modules for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 305. A user profile includes information about the user that was explicitly shared by the user, and may also include profile information inferred by the social networking system 100. In one embodiment, a user profile includes multiple data fields, each data field describing one or more attributes of the corresponding user of the social networking system 100. The information stored in the a user profile maintained by the user profile store 305 describes including biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of the social networking system 100 displayed in an image.

The content store 310 stores content items maintained by the social networking system 100. Content items may be associated with a user profile and may be displayed when a user profile is viewed or when other content associated with the user profile is viewed. For example, displayed content items may show images or video associated with a user profile or show text describing a user's status. Examples of content items include images, video data, audio data, text data, or other suitable types of data. Additionally, content items may facilitate user engagement by encouraging a user to expand its connections to other users, to invite new users to the system, or to increase interaction with the social networking system 100 by displaying content related to users, objects, activities, or functionality of the social networking system 100. Examples of social networking content items include suggested connections or suggestions to perform other actions, media provided to the social networking system 100, media maintained by the social networking system 100 (e.g., pictures or videos), status messages or links posted by users to the social networking system, events, groups, pages (e.g., representing an organization or commercial entity), and any other content provided by or accessible via the social networking system 100.

In one embodiment, the content store 310 includes advertisements and recommendation units. For example, the content store 310 includes an advertisement store 312 including advertisements and a recommendation unit store 314 including recommendation units. An advertisement included in the advertisement store 312 includes content and a bid amount. The bid amount is associated with an advertisement by an advertiser and is used to determine an expected value, such as monetary compensation, to the social networking system 100 if the advertisement is presented to a user, if the advertisement receives a user interaction, or based on any other suitable condition. For example, the bid amount specifies a monetary amount that the social networking system 100 receives from the advertiser if the advertisement is displayed and the expected value is determined by multiplying the bid amount by a probability of the advertisement being accessed.

As described above in conjunction with FIG. 1, a recommendation unit 110 suggests an action for a user to perform that increases the user's interaction with the social networking system 100 or generates new users of the social networking system 100. For example, a recommendation unit 110 suggests connections to other users of the social networking system 100, suggests applications for use by the user, suggests events for the user to join or attend, or other suitable actions. A recommendation unit 110 in the recommendation unit store 314 includes content describing the suggested action for the user and a score.

The social networking system 100 determines the score for a recommendation unit based on the value to the social networking system 100, the value to a content provider, or a combination of both. Determination of a score for a recommendation unit is further described in U.S. patent application Ser. No. 13/549,080, filed on Jul. 13, 2012, which is hereby incorporated by reference in its entirety. While a variety of factors may be used when determining the score, the score is typically proportional to an amount by which a user's interaction, or overall interaction, with the social networking system 100 increases if an associated recommendation unit is converted. When a user performs the action suggested by the recommendation unit, the social networking system 100 converts the recommendation unit into data for the social networking system 100 or for a content provider associated with the recommendation unit.

The social networking system 100 scores content items, including recommendation units and advertisements, stored in the content store 310 based on user activity, sponsored item information received from the recommendation unit store 314, and user profile information received from the user profile store 305. To score content items, the social networking system 100 identifies a viewing user 102 and determines scores for content items based on information about the viewing user 102, allowing the score of a content item to indicate the likelihood of the user interacting with the content item. Examples of information about the viewing user 102 used to determine a content item score include the viewing user's interactions with the content item, such as a recommendation unit 110. For example, if the viewing user 102 regularly interacts with a particular application, such as a fitness application to track exercise, content items identifying activity with the fitness application or associated with the fitness application are more likely to be of interest to the viewing user 102, so those content items have a higher score than content items identifying activity occurring in different applications or pages. A content provider, such as a third-party website 230, seeking to promote a new fitness application tracking activity, diet, and rest, may desire promote the new fitness application to social networking system users, such as the viewing user 102, already interacting with the fitness application that tracks exercise. Accordingly, the content provider may provide the social networking system 100 with bids specifying bid values received by the social networking system 100 for presenting a recommendation unit 110 identifying or promoting the new fitness application. The bids may also specify one or more criteria regarding presentation of the recommendation unit 110. For example, the bid value may be provided to the social networking system 100 for presenting the recommendation unit 110 proximate to, or above, a recommendation unit associated with the fitness application tracking exercise. Based on the bid value, the social networking system 100 may increase the score of a recommendation unit 110 associated with the new fitness application, increasing the position of the recommendation unit 110 in a ranking of content items. The amount of increase to the store may be proportional to the bid amount. In a further embodiment, a recommendation unit 110 associated with the new fitness application may be otherwise differentiated from other recommendation units 110 because of the bid value. For example, the recommendation unit 110 associated with the new fitness application may be distinguished using one or any combination of adding animation, color highlighting, or varying the size of the icon representing the recommendation unit 110 for display to the viewing user 102 based on the score of the recommendation unit 110 as modified by the bid value.

In various embodiments, the bid value provided for a recommendation unit 110 may modify the score of the recommendation unit 110 in a variety of ways. For example, the bid value may be a factor in scoring a content item. The bid value may be based on an amount from the content provider for promoting various recommendation units 110 or may be specific to a slot for presentation in the display 104. The bid value may be weighted in some embodiment. The weight may be a constant selected by the social networking system 100 or may be updated based on user feedback received about the ranking of the recommendation unit 110. Machine learning and regression analysis used to optimize the scoring and ranking of recommendation units 110.

Other examples of factors used to determine a score for a recommendation unit include an expected probability of conversion, a type of recommendation unit, and/or attributes of the user presented with the recommendation unit 110. For example, a recommendation unit 110 inviting a new user to join the social networking system 100 may have a higher score than a recommendation unit 110 that connects existing social networking system users because the former provides additional users to the social networking system 100, thereby increasing public exposure to the social networking system 100. In another example, the score is based on factors including: a viewing user's 102 historical interactions with the recommendation unit, historical interaction with similar recommendation units, and historical interaction of other users with the recommendation unit or similar recommendation unit. Historical interactions may be measured relative to a predefined threshold amount associated with one or more attributes of the recommendation unit, the viewing user 102, or other users of the social networking system. Attributes of a user may include, for example, a user's affinity (or closeness) to other users based on the interactions between the users and a user's bibliographic information. Example attributes of a recommendation include the subject matter of the content item associated with the recommendation unit and a bid amount associated with the recommendation unit.

The action logger 315 receives communications about user actions, such as interacting with a recommendation unit, internal to and external to the social networking system 100, and populates the action log 320 with information describing user actions. Such actions may include, for example, adding a connection to another user, sending a message to another user, uploading an image, reading a message from another user, viewing content associated with another user, attending an event posted by another user, among others. These actions are stored in the action log 320. Users may interact with various objects on the social networking system 100, including commenting on posts, sharing links, and checking-in to physical locations via a mobile device, accessing content items in a sequence, or other interactions. Information describing these actions is stored in the action log 320. In addition, a number of actions described in connection with other objects are directed at particular users, so these actions are associated with those users as well. Additional examples of interactions with objects on the social networking system 100 included in the action log 320 include commenting on a photo album, enabling communications between users, becoming a fan of a musician, adding an event to a calendar, joining a group, becoming a fan of a brand page, creating an event, authorizing an application, using an application, and engaging in a transaction. The action log 320 also records a user's interactions with recommendations and advertisements on the social networking system 100 as well as other applications operating on the social networking system 100.

The action log 320 may also store user actions taken on external websites, such as third-party website 230. For example, a fitness application residing on a third-party website 230 that monitors diet, fitness activities, and rest habits may recognize a user of a social networking system 100 through social plug-ins enabling the external website 230 to identify the user of the social networking system 100. Because users of the social networking system 100 are uniquely identifiable, third party websites 230, such as this fitness website, may use the information about these users as they visit their websites or use their applications. The action log 320 records data about these users, including webpage viewing histories, applications that were used, advertisements that were engaged, purchases made, and other patterns from shopping and buying.

The auction module 325 ranks content items and produces a ranked list. In one embodiment, the auction module 325 generates a ranked list of advertisements based on their expected values and generates a separate ranked list of recommendation units based on their scores. In one embodiment, rankings generated by the auction module 325 may be stored as one or more content items in the content store 310. The list of ranked items includes information identifying the ranked items, scores for the items, and category information for each item. Accordingly, the auction module 325 may also rank content items, generating separate rankings including items in specific categories. In some embodiments, categories of items include applications, pages, groups, user-defined categories, or other suitable classifications.

In one embodiment, the auction module 325 determines ranking of recommendation units based on their scores. As described above, bid values associated with recommendation units may affect their score or their position in the ranking. For example, the auction module 325 modifies a score associated with a recommendation unit based on the bid value or expected value of the recommendation unit and uses the modified score for ranking. As another example, the auction module 325 ranks the recommendation units based on their associated scores then modifies the position of various recommendation units in the ranking based on their associated bid values or expected values. Alternatively, recommendation units associated with bid values are separately ranked based on their bid values or scores, and the ranking of recommendation units associated with bid values is separately stored. Based on a ranking, one or more recommendation units are selected for presentation to a viewing user 102. For example, recommendation units having the highest scores are selected or recommendation units having at least a threshold score are selected. As another example, recommendation units having a highest score are selected from different categories.

In one embodiment, the auction module 325 selects advertisements and recommendation units by determining a recommendation value for recommendation units that has the same unit of measurement as the expected value for advertisements. This allows the auction module 325 to generate a unified listing of recommendation units and advertisements from which content items are selected. Selection of one or more advertisements and one or more recommendation units is further described in U.S. patent application Ser. No. 13/549,080, filed on Jul. 13, 2012, which is hereby incorporated by reference in its entirety.

The edge store 330 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, by, for example, expressing interest in a content item on the social networking system 100, sharing a link with other users of the social networking system 100, and commenting on posts made by other users of the social networking system 100. The edge store 330 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 330, in one embodiment. In some embodiments, connections between users may be stored in the user profile store 305, or the user profile store 310 may access the edge store 330 to determine connections between users.

The display generator 335 determines when a social networking system user has requested information and retrieves content from the content store 310 for presentation to the social networking system user. The display generator 335 may also control the layout and format of the information displayed to the social networking system user. In one embodiment, the display generator 335 presents different types of content in different regions. For example, content describing actions taken by other users of the social networking system 100 connected to the user is displayed in a first region while other content, such as recommendation units, are displayed in a second region. Content items for presentation to a viewing user 102 may be retrieved and presented based on information from the auction module 325. The display generator 335 may format the content items, including recommendation units, for display in various formats, including a set of icons displayed in a particular location on a page for viewing the social networking system 100, a drop down menu of notifications that may be accessed and hidden response to a viewing user's clicks, and a messaging system that prioritizes messages delivered to a viewing user 102 of the social networking system 102.

The display generator 335 organizes recommendation units presented to a user as suggested content to increase the likelihood of the user interacting with the recommendation units, which increases the value of the recommendation units to the social networking system 100. For example, the display generator 335 organizes recommendation units so that recommendation units having ranking above a threshold are more prominently displayed relative to other recommendation units to increase the likelihood of user interactions with the recommendation units ranked above the threshold. In other examples, the display generator 335 organizes recommendation units so recommendation units associated with bid values are visually distinguished from recommendation units not associated with bid values. In a further example, the display generator 335 displays recommendation units based on various factors, such as time, user status, user usage patterns, or other suitable user data.

The web server 340 links the social networking system 100 via the network 220 to the one or more client devices 210, as well as to the one or more third party websites 230. The web server 340 serves web pages, as well as other web-related content, such as JAVA®, FLASH®, XML and so forth. The web server 340 may receive and route messages between the social networking system 100 and the client device 210, for example, instant messages, queued messages (e.g., email), text and SMS (short message service) messages, or messages sent using any other suitable messaging technique. A user may send a request to the web server 340 to upload information, for example, images or videos that are stored in the content store 310. Additionally, the web server 340 may provide application programming interface (API) functionality to send data directly to native client device operating systems, such as IOS®, ANDROID™, WEBOS® or RIM.

Sponsored Recommendations in a User Interface

Figure 4:
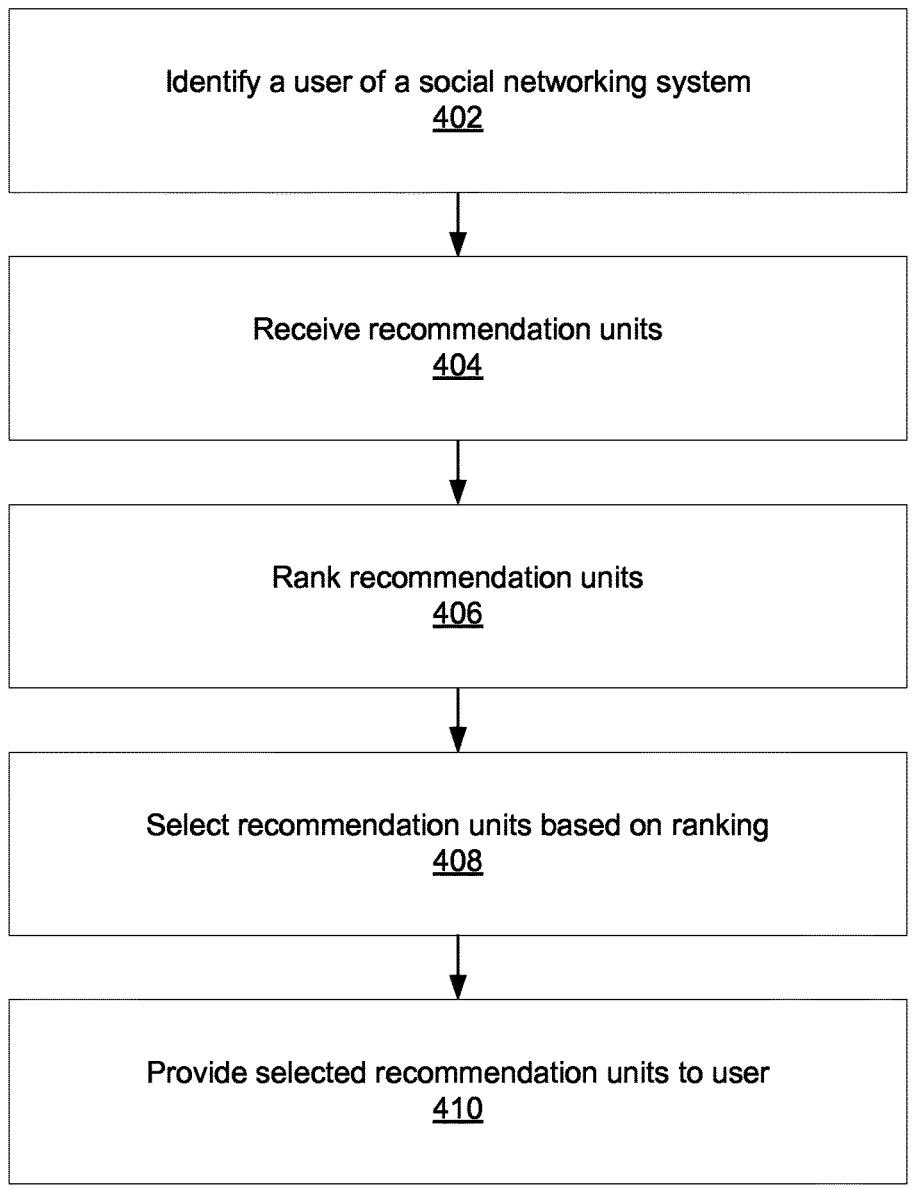
FIG. 4 is a flow chart of a process for selecting recommendation units for presentation to a viewing user, in accordance with an embodiment.

FIG. 4 is a flow chart illustrating one embodiment of a process 400 for selecting recommendation units for presentation. The process 400 may be performed at a server system (e.g., social networking system 100) having one or more processors and non-transitory memory. The non-transitory memory stores one or more programs to be executed by the one or more processors. The one or more programs include instructions for carrying out the process.

The social networking system 100 identifies 402 a user of the social networking system to which recommendation units are presented. The recommendation units may provide suggestions to use or install one or more items, such as applications, or perform other interactions with objects maintained by the social networking system 100. Recommendation units are received 404 by the social networking system 100. For example, the recommendation units are retrieved from a content store 410 or may be received 404 from a content provider or application provider. One or more of the recommendation units are associated with a bid amount, as described above in conjunction with FIGS. 1 and 4, which specifies an amount of compensation received by the social networking system 100 from the content provider or application provider for presenting the recommendation unit. The social networking system 100 may identify recommendation units associated with a bid amount.

The recommendation units are then ranked 406. As described above in conjunction with FIGS. 1 and 3, the recommendation units may each be associated with a score reflecting the value to the social networking system of the user interacting with the recommendation unit. Examples of interactions with a recommendation unit include comments, shares, likes, mentions, and/or custom actions such as "listening" and "playing." The score may also account for bid values associated with recommendation units. For example, score for recommendation units associated with bid values may be increased by an amount based on the bid amount or based on the expected value to the social networking system 100 of presenting the bid amount. In some embodiments, the score may be generated based on factors for maximizing the value of a recommendation unit associated with a bid amount, including factors for determining one or more content items that the viewing user may be interested in viewing. Additionally, a score may be reduced based on negative user feedback received from the user regarding an entity associated with the recommendation unit, content included in the recommendation unit, or other suitable factors.

In one embodiment, the scores are used to rank 406 the recommendation units. When ranking the recommendation units, the ranking of a recommendation unit associated with a bid amount is increased relative to at least one recommendation unit not associated with a bid amount. One or more recommendation units are selected 408 based on the ranking, so by increasing the ranking of a recommendation unit, the bid amount increases the likelihood of the recommendation unit being selected 408. The amount by which the ranking of the recommendation unit associated with a bid amount is increased may be based on the bid amount or on an expected value associated with the bid amount; hence, a larger bid amount may result in a larger ranking increase. The selected recommendation units are then provided 410 to the user for display.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying a user of a social networking system;
   maintaining, at the social networking system, a plurality of data stores including a content data store comprising a plurality of objects and an edge data store comprising plurality of connections therebetween;
   receiving, at the social networking system, a plurality of recommendation units for the user, each recommendation unit including a link to a recommendation that suggests the user perform an action in the social networking system on an object in the content data store identified by the recommendation unit, the action performed by the user, responsive to the user accessing the link, being stored in the edge data store by the social networking system;
   retrieving, from the edge data store, information describing one or more connections in the edge data store between the user and the object identified by each of the recommendation units;
   determining the user's prior interactions with the object identified by each recommendation unit based on the retrieved information describing one or more connections in the edge data store between the user and the object identified by each of the recommendation units;
   computing a score in a first dimension for each of the plurality of recommendation units based at least in part on the determined prior interactions of the user with the object identified by each recommendation unit;
   receiving a score in a second dimension from a content provider associated with a sponsored recommendation unit of the plurality of recommendation units;
   converting at least the score in the first dimension or the score in the second dimension into scores in a common dimension for comparing the scores in the first dimension and the scores in the second dimension;
   increasing a score in the common dimension for the sponsored recommendation unit relative to one or more of the other recommendation units based on the received score from the content provider associated with the sponsored recommendation unit;
   ranking the plurality of recommendation units based on the scores in the common dimension;
   selecting one or more recommendation units based at least in part on the ranking;
   organizing a user interface to include the selected one or more recommendation units, wherein the selected one or more recommendation units are ordered within a limited display space in the user interface according to the ranking; and
   sending the organized user interface for display in a computing device of the user.

2. The method of claim 1, wherein the score of one or more of the recommendation units is based at least in part on an amount of interaction between the user and the social networking system.

3. The method of claim 1, wherein ranking the plurality of recommendation units comprises:
   determining, in association with a sponsored recommendation unit, an expected-value score in the second dimension, wherein the expected-value score is based in part on the received score in the second dimension from the content provider;
   converting the expected-value score into the common dimension;
   modifying a score in the common dimension associated with the sponsored recommendation unit based on the expected-value score in the common dimension; and
   ranking the recommendation units based at least in part on the scores.

4. The method of claim 3, wherein the expected-value score is based on the received score in the second dimension from the content provider and a likelihood of the user interacting with the sponsored recommendation unit.

5. The method of claim 4, wherein modifying the score in the common dimension associated with the sponsored recommendation unit based on the expected-value score in the common dimension comprises:
   increasing the score in the common dimension associated with the sponsored recommendation unit by an amount determined in part by the expected-value score.

6. A method comprising:
   identifying a user of a social networking system;
   maintaining, at the social networking system, a plurality of data stores including a content data store comprising a plurality of objects and an edge data store comprising plurality of connections therebetween;

receiving, at the social networking system, a plurality of recommendation units for the user, each recommendation unit including a link to a recommendation that suggests the user perform an action in the social networking system on an object in the content data store identified by the recommendation unit, the action performed by the user, responsive to the user accessing the link, being stored in the edge data store by the social networking system;

retrieving, from the edge data store, information describing one or more connections in the edge data store between the user and the object identified by each of the recommendation units;

determining, for an additional user of the social networking system, the additional user's prior interactions with the object identified by each recommendation unit based on the retrieved information describing one or more connections in the edge data store between the user and the object identified by each recommendation unit;

computing a score in a first dimension for each of the plurality of recommendation units based at least in part on the determined prior interactions of the additional users of the social networking system with the object identified by each recommendation unit;

receiving a score in a second dimension from a content provider associated with one or more sponsored recommendation units of the plurality of recommendation units;

converting at least the score in the first dimension or the score in the second dimension into scores in a common dimension;

increasing a score in the common dimension for each sponsored recommendation unit based on the received score from the content provider associated with the sponsored recommendation unit;

ranking the plurality of recommendation units based on the scores in the common dimension;

selecting one or more recommendation units based at least in part on the ranking;

organizing a user interface to include the selected one or more recommendation units, wherein the selected one or more recommendation units are ordered within a limited display space in the user interface according to the ranking; and sending the organized user interface for display in a computing device of the user.

7. The method of claim 6, wherein the score of a recommendation unit is based at least in part on an amount of interaction between the user and the social networking system.

8. The method of claim 6, wherein ranking the plurality of recommendation units comprises:

determining, in association with a sponsored recommendation unit, an expected-value score in the second dimension, wherein the expected-value score is based at least in part on the received score in the second dimension from the content provider;

converting the expected-value score into the common dimension;

modifying a score in the common dimension associated with each sponsored recommendation unit based on the expected-value score in the common dimension; and ranking the recommendation units based at least in part on the scores.

9. The method of claim 8, wherein the expected-value score is based on the received score in the second dimension from the content provider and a likelihood of the user interacting with the sponsored recommendation unit.

10. The method of claim 8, wherein modifying the score in the common dimension associated with the sponsored recommendation unit based on the expected-value score in the common dimension comprises:

increasing the score in the common dimension associated with a sponsored recommendation unit by an amount determined in part by the expected-value score.

* * * * *